(12) United States Patent
Subramaniam

(10) Patent No.: US 8,085,929 B2
(45) Date of Patent: Dec. 27, 2011

(54) METHOD AND APPARATUS FOR PROVIDING CUSTOMIZED RINGBACKS

(75) Inventor: Senthil Kumar Subramaniam, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 749 days.

(21) Appl. No.: 12/173,567

(22) Filed: Jul. 15, 2008

(65) Prior Publication Data

US 2010/0014647 A1    Jan. 21, 2010

(51) Int. Cl.
*H04M 3/06* (2006.01)

(52) U.S. Cl. ............ 379/373.01; 370/352; 379/87; 379/207.16; 379/211.01; 379/215.01; 379/221.08; 709/203

(58) Field of Classification Search ........ 379/29.01, 379/87, 88.13, 211.01, 76, 207.08, 207.16, 379/215.01, 221.03, 221.08, 373.01; 709/203; 370/352
See application file for complete search history.

(56) References Cited

U.S. PATENT DOCUMENTS

| | | | |
|---|---|---|---|
| 7,184,532 B2 * | 2/2007 | Creamer et al. | 379/207.08 |
| 7,340,049 B2 * | 3/2008 | Batni et al. | 379/221.08 |
| 7,613,287 B1 * | 11/2009 | Stifelman et al. | 379/215.01 |
| 7,769,155 B2 * | 8/2010 | Radziewicz et al. | 379/207.16 |
| 7,813,490 B2 * | 10/2010 | DeMent et al. | 379/221.03 |
| 7,920,689 B2 * | 4/2011 | Radziewicz et al. | 379/215.01 |
| 7,953,211 B2 * | 5/2011 | Radziewicz et al. | 379/76 |
| 7,961,862 B2 * | 6/2011 | Batni et al. | 379/207.16 |
| 2006/0136556 A1 * | 6/2006 | Stevens et al. | 709/203 |
| 2007/0003040 A1 * | 1/2007 | Radziewicz et al. | 379/211.01 |
| 2007/0133760 A1 * | 6/2007 | Cotignola et al. | 379/88.13 |
| 2007/0291931 A1 * | 12/2007 | DeMent | 379/418 |
| 2007/0294425 A1 * | 12/2007 | Sobti et al. | 709/231 |
| 2008/0063168 A1 * | 3/2008 | Haley et al. | 379/201.01 |
| 2008/0095326 A1 * | 4/2008 | Qi et al. | 379/67.1 |
| 2008/0108334 A1 * | 5/2008 | Wang et al. | 455/414.1 |
| 2008/0130841 A1 * | 6/2008 | Pan et al. | 379/87 |
| 2009/0185665 A1 * | 7/2009 | Chen | 379/29.01 |
| 2009/0185669 A1 * | 7/2009 | Zitnik et al. | 379/217.01 |
| 2010/0014647 A1 * | 1/2010 | Subramaniam | 379/87 |

* cited by examiner

*Primary Examiner* — Gerald Gauthier

(57) ABSTRACT

An approach is provided for providing custom ringback services. The approach includes prompting a user for content as part of a managed ringback service. The content is received from the user, and is set as a ringback. An identifier corresponding to the ringback is received from the user, wherein the identifier is associated with a caller.

19 Claims, 10 Drawing Sheets

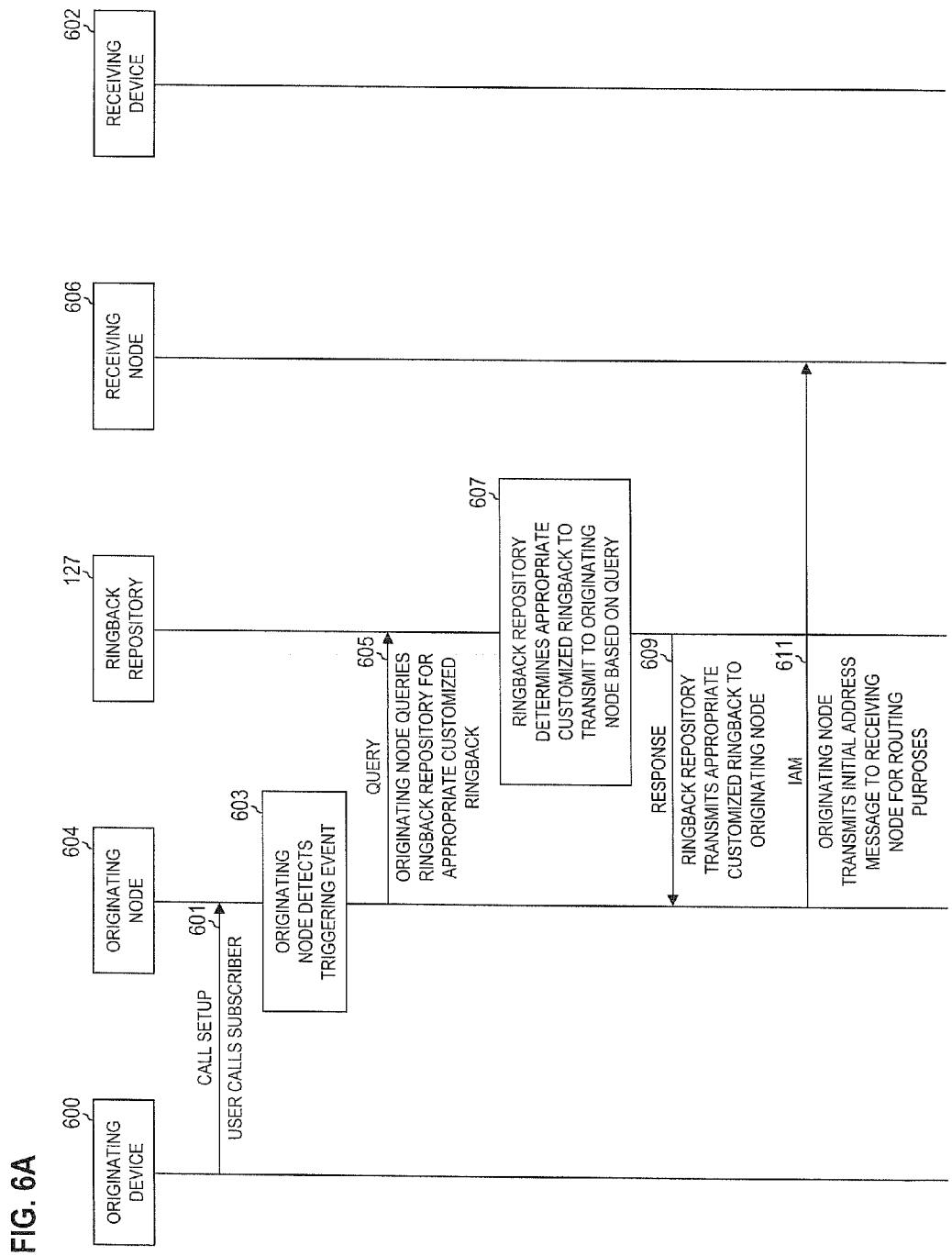

METHOD AND APPARATUS FOR PROVIDING CUSTOMIZED RINGBACKS

BACKGROUND INFORMATION

The telecommunications industry offers a wide variety of telephony services to customers via wired and wireless networks. However, with the advent of the Internet, an increasing number of individuals have been migrating from the use of traditional communication based technologies to synergistic multimedia platforms. As such, traditional telecommunications service providers are being challenged to develop new telephony-based services and features to remain competitive, as well as develop new sources of revenue. When a caller places a call to a called party, the telephony network signals a connection establishment attempt through use of an audible ringing tone or ringback signal. Traditionally, this ringback tone conveyed no other information.

Therefore, there is a need for an approach that utilizes ringbacks more effectively.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A and 6B are sequence diagrams of a communication session utilizing a customized ringback in lieu of a standard ringback tone, according to an exemplary embodiment.

DESCRIPTION OF THE PREFERRED EMBODIMENT

A preferred apparatus, method, and software for providing custom ringback services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to custom ringback services, it is contemplated that the various exemplary embodiments are also applicable to custom ringtone and endtone services. As used herein, ringbacks may include any media or multimedia-type content, such as any aural (e.g., music, sound, utterance, etc.), visual (e.g., image, text, video, etc.), or vibratory (e.g., pulse pattern, etc.) indicia, as well as combinations thereof. Further, the terms communication device, customer premise equipment (CPE), end user terminal (EUT), and voice-enabled device are used interchangeably.

Figure 1:
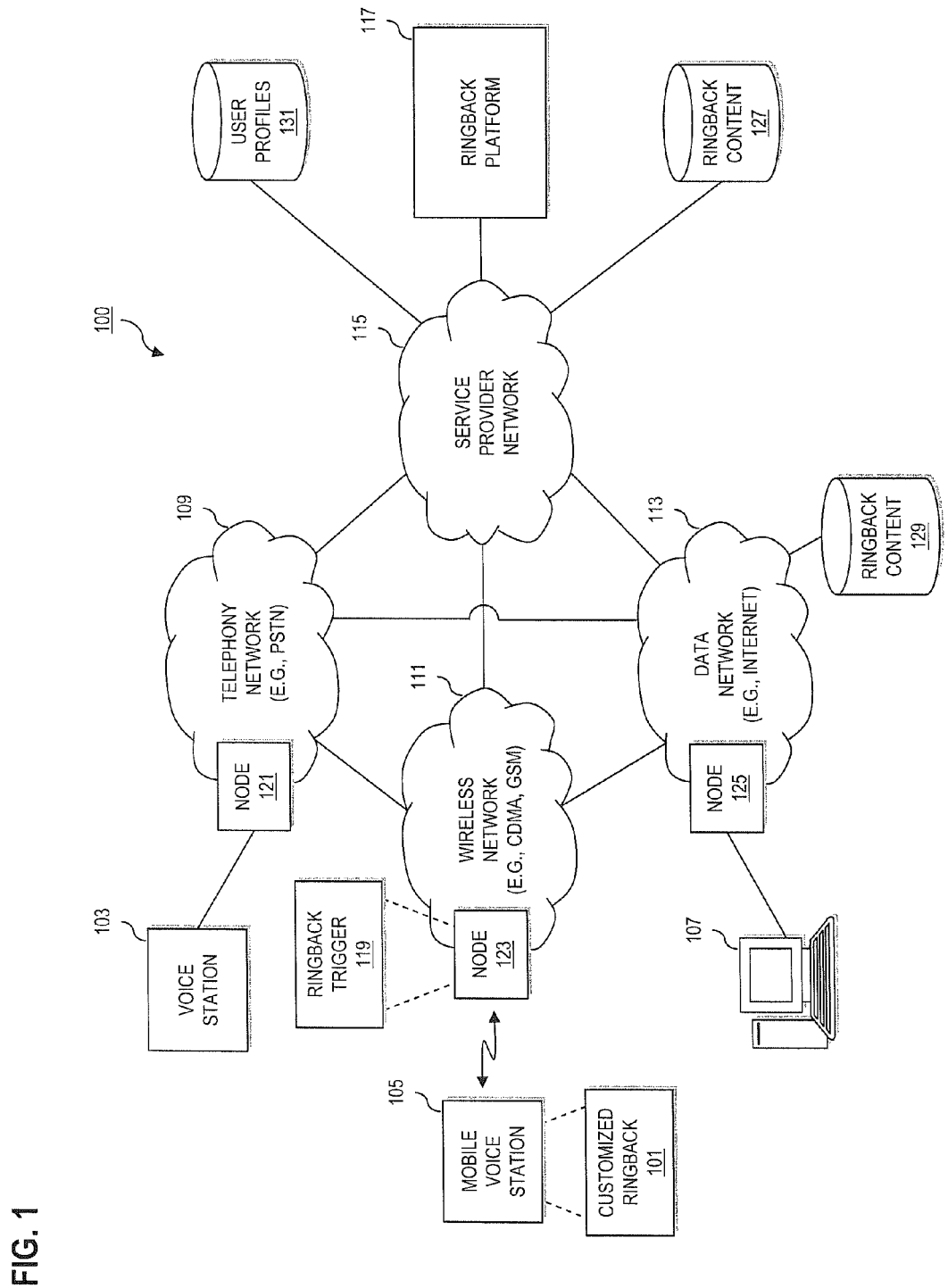
FIG. 1 is a diagram of a system capable of providing custom ringback services, according to an exemplary embodiment.

FIG. 1 is a diagram of a system capable of providing custom ringback services, according to an exemplary embodiment. For the purposes of illustration, a system 100 for providing customized ringbacks (e.g., customized ringback 101) that can be developed using and/or provided to one or more voice-enabled devices (e.g., voice station 103, mobile voice station 105, and/or computing device 107), over one or more communication networks (e.g., telephony network 109, wireless network 111, and/or data network 113), is described with respect to a service provider network 115. While specific reference will be made thereto, it is contemplated that system 100 may embody many forms and include multiple and/or alternative components and facilities.

As mentioned, traditionally, when a calling party initiates a communication session (e.g., telephone call) with a called party over an existing communication network, a network node (e.g., call processing switch) of, for example, the called party provides the calling party with a uniform, predefined tone until the called party accepts (e.g., answers) the communication session. This uniform, predefined tone is generally referred to as a ringback tone. Typically, the ringback tone is an intermittent analog transmission (e.g., one or more signals) generated by a network node and transported via a back channel/link present between the network node and an originating device (e.g., telephone) of the calling party. It is noted that the back channel/link may traverse one or more network nodes configured to establish the communication session between the calling party and the called party. Accordingly, a conventional ringback tone is commonly provided by the network node servicing the called party, whereby the ringback tone is not modifiable by either the calling party or the called party. That is, the uniform, predefined tone is selected and provided by a telecommunications service provider hosting the communication session and, thereby, the same for all communication session attempts.

Telecommunications service providers are beginning to introduce ringback services whereby subscribers to the services may pre-select from existing sets of audio and/or multimedia content to be transported to a calling party during the "connection stage" of the communication session. These ringback services enable parties attempting to establish a communication session with the subscriber to be provided with subscriber pre-selected audio and/or multimedia content instead of the uniform, predefined tone pre-selected by a telecommunications service provider. It is noted, however, that these ringback services do not enable the subscribers to create their own personalized ringbacks, but instead limit subscribers to the "available" ringback content of the service provider. Consequently, existing ringback services do not enable subscribers to robustly individualize their communication experiences. Thus, it is apparent that more flexible, efficient techniques for the creation and management of customized ringbacks are needed.

Therefore, the approach according to certain embodiments stem from the recognition that deploying custom ringback services, whereby subscribers can create and manage their own customized ringbacks, provides efficient and convenient techniques to enable individuals to personalize their communication experiences, as well as provides telecommunications service providers a synergistic approach for leveraging existing infrastructures and for generating new sources of revenue.

According to one embodiment, system 100 introduces custom ringback services whereby subscribers can establish a communication session with a ringback platform 117 via a voice-enabled device (e.g., voice station 103, mobile voice station 105, and/or computing device 107) to create (e.g., record) and manage (e.g., schedule) one or more customized ringbacks, as well as register and receive authentication information for the custom ringback service. In particular implementations, the communication session may be established by placing a telephone call to an interactive voice response (IVR) interface, whereby users may input authentication information (e.g., coded key, personal identification number (PIN), username, password, voice print, etc.) associated with a user account to access the custom ringback services provided by ringback platform 117. As such, users may be permitted to access ringback platform 117 by placing a telephone call to a designated telephone number, such as a toll-free access number (e.g., 1-800, 1-888, etc.), and providing sufficient authentication information, e.g., PIN, thereafter, so as to create and manage one or more customized ringbacks. It is also contemplated that access to ringback platform 117 may be effectuated through short messaging service (SMS) and/or multimedia messaging service (MMS) interfaces, which may, in turn, interface with the IVR interface. Namely, subscribers may be permitted to communicate with ringback platform 117 via one or more messaging formats, whereby authorization information, e.g., a coded key, customized ringback content, and/or management information may be provided to ringback platform 117 in the form of one or more SMS and/or MMS messages. In other implementations, subscribers may access the custom ringback services provided by ringback platform 117 through an online interface, e.g., web interface. That is, subscribers may be permitted to access ringback platform 117 via a networked "ringback site" by logging onto the site with sufficient authentication information, e.g., username and password, so as to create and manage one or more customized ringbacks. As such, ringback platform 117 may acquire customized ringbacks from users, while users may create and manage these customized ringbacks via one or more interfaces of ringback platform 117, e.g., an IVR interface, online interface, and/or SMS/MMS interface.

According to another embodiment, system 100 also introduces custom ringback services whereby ringback platform 117 is provided for setting one or more communication session processing triggers, e.g., ringback trigger 119, on one or more communication session processing nodes, e.g., nodes 121-125, of networks 109-113. These communication session processing triggers can be application programming interfaces (API) configured to "trap," or otherwise suspend, the processing of a communication session based on certain predefined conditions and, based on those, additional, or other predefined conditions, to retrieve one or more subscriber-created, customized ringbacks, e.g., customized ringback 101, for the "connection stage" of the communication session. Namely, upon the occurrence of certain predefined conditions, the communication session processing triggers are configured to retrieve subscriber created and managed customized ringbacks from one or more ringback content repositories, such as ringback content repositories 127 and/or 129, so that the communication session processing nodes may transfer appropriate customized ringbacks, e.g., customized ringback 101, to a calling party instead of a uniform, predefined ringback tone or merely "available" ringback content of a service provider. In particular implementations, the predefined conditions may be established by subscribers during customized ringback creation and/or management processes with ringback platform 117.

As seen in FIG. 1, service provider network 115 enables communication devices 103-107 to access ringback platform 117 so that subscribers can create and manage one or more customized ringbacks, such as customized ringback 101. In this manner, ringback platform 117 may be configured to record ringback content received from, for example, a subscriber in response to prompting the subscriber with a menu of options for creating a customized ringback 101. According to certain implementations, ringback platform 117 enables subscribers to create customized ringbacks 101 by recording audio content received from a subscriber at a voice-enabled device (e.g., voice station 103) over a voice communication session. Various other embodiments of ringback platform 117 permit subscribers to create customized ringbacks 101 through SMS and/or MMS messages, whereby ringback platform 117 is configured to receive SMS and/or MMS content from subscribers via one or more of networks 109-115. In further embodiments, ringback platform 117 allows subscribers to include media or multimedia-type content, such as aural (e.g., music, sound, utterance, etc.), visual (e.g., image, text, video, etc.), and/or vibratory (e.g., pulse pattern, etc.) indicia, as, or as part of, a customized ringback. In this manner, ringback platform 117 is also provided for generating and setting one or more ringback triggers 119 on one or more nodes 121-125 of networks 109-113 for making customized ringbacks (e.g., customized ringback 101) available to calling parties based on one or more predefined conditions. Accordingly, ringback platform 117 is further configured to allow subscribers to manage, or otherwise schedule, customized ringbacks 101 via the one or more predefined conditions. That is, ringback platform 117 can be configured to receive predefined conditions from subscribers via communication devices 103-107 in response to ringback platform 117 prompting subscribers with a menu of options for managing customized ringbacks 101. Ringback platform 117 is more fully described in accordance with FIG. 2.

Figure 2:
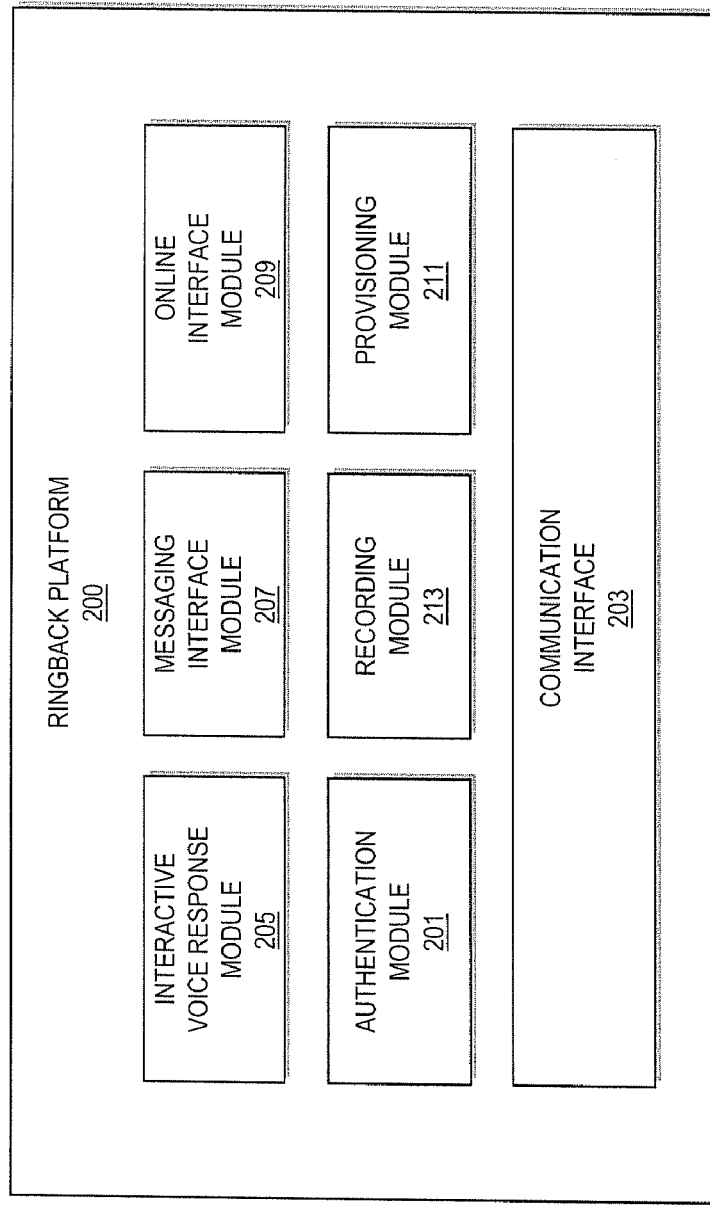
FIG. 2 is a diagram of a ringback platform for acquiring customized ringbacks and provisioning ringback triggers, according to an exemplary embodiment.

FIG. 2 is a diagram of a ringback platform for acquiring customized ringbacks and provisioning ringback triggers, according to an exemplary embodiment. Ringback platform 200 may comprise computing hardware (such as described with respect to FIG. 7), as well as include one or more components configured to execute the processes described herein for providing the custom ringback services of system 100 to subscribers at communication devices 103-107. In one implementation, ringback platform 200 includes authentication module 201, communication interface 203, interactive voice response (IVR) module 205, messaging interface module 207, online interface module 209, provisioning module 211, and recording module 213. Further, ringback platform 200 may communicate with one or more of nodes 121-125, as well as one or more repositories, e.g., ringback content repositories 127 and 129 and/or user profiles repository 131. Particular other embodiments enable ringback platform 200 to also communicate with one or more subscribers via communication devices 103-107. It is contemplated, however, that ringback platform 200 may embody many forms and include multiple and/or alternative components. For example, it is contemplated that the components of ringback platform 200 may be combined, located in separate structures, and/or separate physical locations. In other words, a specific topology is not critical to embodiments of ringback platform 200 or system 100.

As seen in FIG. 2, ringback platform 200 includes one or more access interfaces, e.g., IVR module 205, messaging interface module 207, and online interface module 209, to enable subscribers various mechanisms to communicate within ringback platform 200, such as relaying customized ringback content and/or one or more predefined conditions (e.g., policy information) to ringback platform 200. Accordingly, access interfaces 205-209 can be configured to lead a subscriber through the process of recording and/or editing a customized ringback, as well as the process of gathering policy information (e.g., predefined conditions), using a menu of options, prompts, and questions that are transmitted to the subscribers via communication devices 103-107. In response, subscribers may provide specific information, issue commands, make menu selections, and provide content corresponding to a customized ringback and/or provide policy information for managing their customized ringbacks. It is noted that the mode of response will be contingent upon the access interface utilized, which is made more apparent below. Access interfaces 205-209 may operate in concert, as standalone components, and/or in distributed fashions. It is also contemplated that access interfaces 205-209 may be provided apart from ringback platform 200, e.g., as standalone/distributed facilities and/or as part of other components/facilities of system 100.

In this way, access interfaces 205-209 may utilize recording module 213 for recording content corresponding to a customized ringback, such as the spoken utterances of subscribers. Recording module 213 can be configured to record the content as one or more files embodying a customized ringback (e.g., customized ringback 101) that may be stored to a local memory (not illustrated) of ringback platform 200, or an accessible ringback content repository of system 100, such as ringback content repositories 127 and/or 129. As such, the recorded content, which once recorded may correspond to a customized ringback, may be made available to other components and/or facilities of system 100 for carrying out the processes described herein. Recording module 213 may be embodied by other components of ringback platform 200, or may be remotely located from ringback platform 200. In this way, it is also contemplated that access interfaces 205-209 may be configured having the functionality of recording module 213.

According to one embodiment, recording module 213 may record content in a first format and then may convert such format into a second format, which can enable customized ringbacks to be made more easily accessible to a diverse set of system 100 components and/or facilities. A translator (not illustrated) may be provided for this purpose. These files, which represent the same recording, may then be suitably stored at ringback platform 200 or any other suitable location, such as ringback content repositories 127 and/or 129. According to one embodiment, customized ringbacks may be recorded in a companding algorithm (e.g., μ-law), eight kilobit phone quality waveform audio (WAV) format; however, any suitable format may be utilized and/or converted to, such as an advanced audio coding (AAC) format, audio interchange file format (AIFF), AU file format, moving picture experts group (MPEG) file format, windows media audio (WMA) format, etc.

According to one embodiment, IVR module 205, among other functions, collects from and provides information to subscribers, as well as provides subscribers with customized ringback managing (e.g., scheduling) capabilities. In one implementation, IVR module 205 utilizes communication interface 203 for communication with one or more subscribers over telephony network 109, and in certain embodiments, wireless network 111 and/or data network 113, as well. As such, communication interface 203 may embody one or more communication session interfaces (e.g., telephony interface), which may include a resource manager (not shown) and/or a voice browser. In alternative embodiments, other communication session interfaces are utilized depending on the access method of the subscriber, such as message interface module 207 for SMS and/or MMS communications or online interface module 209 for, for instance, voice over internet protocol (VoIP) communications. Additionally or alternatively, IVR module 205 may provide or selectively include one or more of these components.

The resource manager provides various speech resources, such as an automatic speech recognizer (ASR) and a text-to-speech (TTS) engine. The TTS engine converts textual information (digital signal) from ringback platform 200 to speech (analog signal) for playback to subscribers. As such, various embodiments enable ringback content to be stored as delimited text files, as opposed to one or more of the file formats previously delineated. The TTS engine accomplishes this transition between text and speech through a front-end input and a back-end output. The input converts raw text into its written-out word equivalent through text normalization, preprocessing, and/or tokenization. Words are then assigned phonetic transcriptions and divided into prosodic units, e.g., phrases, clauses, and/or sentences. Using this combination of phonetic transcriptions and prosody arrangements, the front-end input communicates a symbolic linguistic representation to the back-end output for synthesizing. Based on the desired level of naturalness or intelligibility, the back-end output is capable generating speech waveforms representing the actual audible output transmitted to subscribers.

The ASR can effectively function as a speech recognition system. As such, the ASR effectively converts spoken language (represented by analog signals) into textual or equivalent symbolic form (digital signal) for processing by, for example, the voice browser. The voice browser may play pre-recorded audio content to the user in lieu of, or in addition to, use of the TTS engine. As such, the audio content provided via ringback platform 200 may also be stored in corresponding multimedia formats, which may provide for more realistic playback. According to one embodiment, the resource manager may include an analog-to-digital and digital-to-analog converter for signaling between one or more of communication devices 103-107 and the voice browser, for example. Further, in alternative embodiments, the voice browser may contain speech recognition and synthesis logic that implements the above, thereby extracting meaning from the spoken utterances of a subscriber and producing acoustic renditions of text directly. As such, IVR module 205 may utilize the ASR and/or the TTS functionalities to prompt subscribers via a menu of options to create and manage one or more customized ringbacks, such as customized ringback 101.

Accordingly, the voice browser can function as a gateway between a call, for example, and a variety of networked applications, e.g., the customized ringback creation and management applications of ringback platform 200. The voice browser may employ functionality corresponding to microphones, keypads, and speakers instead of keyboards, mice, and monitors of conventional web-based systems. As such, the voice browser can be configured to process pages of markup language, such as voice extensible markup language (VoiceXML), speech application language tags (SALT), hypertext markup language (HTML), and others such as wireless markup language (WML) for wireless application protocol (WAP) based applications, and the World Wide Web (W3) platform for handheld devices, residing on, or accessible to, ringback platform 200. Since a broad level of markup languages can be supported, the voice browser may be configured accordingly, i.e., configured to include a VoiceXML-compliant browser, a SALT-complaint browser, an HTML-compliant browser, a WML-compliant browser, or any other markup-language complaint browser, for communicating with subscribers at communication devices 103-107. As with standard web services and applications, the voice browser may utilize a standardized networked infrastructure, i.e., hypertext transport protocol (HTTP), cookies, web caches, uniform resource locators (URLs), secure HTTP, etc., to establish and maintain connections.

In this manner, IVR module 205 acts as an all-purpose portal to ringback platform 200, wherein subscribers can interact with IVR module 205 (and thereby ringback platform 200) using either spoken utterances, dual-tone multi-frequency (DTMF) signals, or other suitable interfacing signal, such as SMS/MMS messages, etc. This enables IVR module 205 to establish one or more communication ports on communication interface 203 for receiving communication sessions (e.g., calls) for the custom ringback service from one or more voice-enabled devices (e.g., voice station 103) by subscribers. IVR module 205 may also retrieve ringback content from repositories 127 and/or 129, and transmit such content to subscribers over the communication session, such as for reviewing and/or editing a customized ringback, managing a customized ringback, etc. In turn, IVR module 205 may also receive, via the communication session, control commands, e.g., spoken utterances, DMTF signals, SMS/MMS messages, etc., from a subscriber at a voice-enabled device (e.g., mobile voice station 105) for managing, or otherwise scheduling, the transmission of customized ringbacks to various calling parties attempting to establish a communication session with the subscriber.

Ringback platform 200 may also behave as a website (or other online interface 209) to permit access to the custom ringback services of ringback platform 200 by computing devices 107 and/or mobile voice station 105 over data network 113 and/or wireless network 111, respectively. According to certain embodiments, customized ringbacks may be created and/or managed via a web browser or other web-based application. Furthermore, online interface 209 may execute a graphical user interface (GUI) application configured to provide users with one or more menus of options relating to customized ringback creation and/or management, as well for building user profile accounts and/or establishing condition(s) for managing the transmission of customized ringbacks to calling parties. In particular embodiments, online interface 209 enables subscribers to "upload" to ringback platform 200, ringback content corresponding to a customized ringback 101, user profile information, and/or conditions or criteria for controlling the transmission of customized ringbacks. This content and/or data may be stored to one or more repositories, such as ringback content repositories 127 and/or 129 and/or user profiles repository 131, as well as any other suitable location or memory of system 100 and/or ringback platform 200. In other embodiments, this content and data may be "downloaded" from ringback platform 200 and/or repositories 127-131, so that subscribers may review and/or edit a customized ringback, as well as manage the transmission of customized ringbacks to calling parties.

Accordingly, the GUI(s) of online interface module 209 may be presented in one or more windows of a conventional browser application. The GUI(s) may be generated and presented in one or more windows controlled by computing device 107 and/or mobile voice station 105. By way of example, mobile voice station 105 may include a custom ringback service interface that provides soft controls for creating and/or managing customized ringbacks and/or manipulating user account information, including, for instance, the predefined conditions or criteria for provisioning customized ringbacks to calling parties. The interface may include one or more "soft keys" or other graphical user interface (GUI) implementation, such as a keypad, touch pad, etc. As such, mobile voice station 105 may include a processor and memory configured to store and execute instructions for supporting the custom ringback service, as well as other communication functions. Accordingly, the GUIs of online interface module 209 (or corresponding devices 105 and/or 107) may include pages of both textual and/or graphical information, as well as various interactive control widgets, through which users may access and interact with ringback platform 200, IVR module 205, and/or messaging interface module 207. Thus, users at mobile voice station 105 and/or computing device 107 may input commands to online interface module 209 to create and manage customized ringbacks, as well as manipulate user profiles corresponding to the custom ringback service of system 100.

As shown, authentication module 201 may be provided for authenticating (or authorizing) subscribers to the custom ringback generation and management services of ringback platform 200. It is contemplated that authentication module 201 may operate in concert with IVR module 205, messaging interface module 207, and/or online interface module 209 for authenticating subscribers. That is, authentication module 201 may verify subscriber provided credential information against corresponding credential information stored within a user profiles repository 131 to provide selective access to the functions of ringback platform 200. By way of example, the credential information may include "log on" information corresponding to a user name, password, coded key, or other unique identification parameter, such as a PIN. In certain other embodiments, the credential information may include any one or combination of a birth date, an account number (e.g., bank, credit card, billing codes, etc.), a social security number (SSN), an address (e.g., work, home, internet protocol (IP), media access control (MAC), etc.), telephone listing (home, work, cellular, etc.), as well as any other form of uniquely identifiable datum, e.g., biometric code, voice print, etc. Subscribers may provide this information using either spoken utterances and/or DTMF signals transmitted through IVR module 205 and/or communication interface 203, as well as SMS/MMS messages transmitted through messaging interface module 207, or packetized information transmitted through online interface module 209. Unobtrusive security may be provided by positively identifying and screening users based on their voice prints transmitted to IVR module 205. Such voice prints may be stored after an initial user profile account building session.

Ringback platform 200 is also shown to include provisioning module 211 for generating and setting one or more ringback triggers (e.g., ringback trigger 119) on one or more call processing nodes (e.g., nodes 121-125) of networks 109-113. In this manner, provisioning module 211 acts as an all purpose service management tool, which generates ringback triggers based information provided to ringback platform 200 by subscribers. Ringback triggers are explained in more detail in accordance with FIG. 1.

Referring back to FIG. 1, system 100 may include both wireline and wireless networks. For example, telephony network 109 may include a circuit-switched network, such as the public switched telephone network (PSTN), an integrated services digital network (ISDN), a private branch exchange (PBX), or other like network. Wireless network 111 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network having voice over Internet protocol (VoIP) capabilities, e.g., a proprietary cable or fiber-optic network.

Although depicted as separate entities, networks 109, 111, 113, and 115 may be completely or partially contained within one another, or may embody one or more of the aforementioned networks. For instance, service provider network 115 may embody any circuit-switched and/or packet-switched telephony network that includes facilities to provide for transport of circuit-switched and/or packet-based telephony communications. It is further contemplated that networks 109, 111, 113, and/or 115 may include components and/or facilities to provide for signaling and/or bearer communications between the various components and/or facilities of system 100. In this manner, networks 109, 111, 113, and/or 115 may embody or include portions of a signaling system 7 (SS7) network, session initiation protocol (SIP) based signaling infrastructure, real-time transport protocol/real-time transport control protocol (RTP/RTCP) signaling framework, or other suitable medium, to support signaling traffic.

Accordingly, the conjunction of networks 109, 111, 113, and/or 115 may be adapted to provide the custom ringback services of system 100, enable user access to ringback platform 117, and facilitate communication sessions between a calling party at an originating device (e.g., mobile voice station 105) and a called party at a receiving device (e.g., voice station 103). As such, the originating and receiving devices, i.e., communication devices 103-107, may include any CPE capable of sending and/or receiving voice communications over networks 109, 111, 113, and/or 115. Communication devices 103-107 may also be capable of communications made available via one or more communication protocols, such as extensible makeup language (XML), hypertext transfer protocol (HTTP), lightweight directory access protocol (LDAP), MMS, transmission control protocol/Internet protocol (TCP/IP), SMS, WAP, etc. For example, voice station 103 may be any plain old telephone service (POTS) device, facsimile machine, etc., while mobile voice station 105 may be any cellular phone, satellite phone, smart phone, wireless phone, or any other suitable mobile voice-enabled device, such as a personal digital assistant (PDA), pocket personal computer, tablet, customized hardware, etc. Further, computing device 107 may be any voice-enabled computing device capable of packetized voice communications, such as a VoIP phone, skinny client control protocol (SCCP) phone, SIP phone, Internet protocol (IP) phone, personal computer with microphone and speaker capabilities, softphone, etc.

In this manner, telephony network 109, wireless network 111, and data network 113 can include one or more communication processing nodes, e.g., nodes 121, 123, and 125, respectively, for facilitating connections between communication devices 103-107, as well as connections between communication devices 103-107 and ringback platform 117. While only a single communication device (e.g., computing device 107) is shown in communication with singular communication processing nodes (e.g., node 125), it is contemplated that a plurality of communication devices may be in communication with the communication processing nodes. It is further contemplated that a communication device may be in communication with a plurality of communication processing nodes. For instance, in particular implementations, computing device 107 may be capable of communication with each of nodes 121-125, or combinations thereof, via suitable hardware and/or software configurations. Exemplary computing system configurations are described in accordance with FIG. 7.

For the purposes of simplicity and clarity, the various communication processing nodes of system 100 will be referred to collectively as nodes 121-125. Nodes 121-125 may be any communication processing device, e.g., gateway, router, service control point (SCP), service switching point (SSP), server, switch, etc., or facility, such as a central office (CO), end office (EO), mobile switching center (MSC), wire center (WC), etc., for opening/closing circuits, completing/breaking electrical paths, and/or selecting/deselecting paths/circuits for use during one or more communication sessions. For example, node 121 may be a voice switch of telephony network 109, node 123 may be an MSC of wireless network 111, and node 125 may be a VoIP switch of data network 113. As such, networks 109, 111, 113, and/or 115 may be any series of nodes and/or points connected by a series of interconnection paths capable of connecting a calling party at an originating device (e.g., mobile voice station 105) to a called party at a receiving device (e.g., voice station 103). These interconnection paths may also serve to connect users at communication devices 103-107 with the custom ringback services provided by ringback platform 117. Furthermore, the interconnection paths may serve as back channels/links for transporting customized ringbacks (e.g., customized ringback 101) to calling parties at originating devices.

According to various embodiments, the operation of nodes 121-125 may be correlated to a communication session model, such as a finite state machine including one or more communication session states that correspond to and describe particular points-in-time for any given communication session. For example, a basic call state model (BSCM) governing the originating and/or terminating side of a communication session may be utilized for these purposes; however, it is contemplated that any suitable model may be implemented. Exemplary control models may include one or more interstate transitions that represent detection points (DP) for allowing communication session processing to occur. That is, the one or more DPs may represent trigger detection points (TDP) including one or more "triggers" responsive to one or more predefined conditions. These "triggers" may utilize one or more application specific processes for detecting the one or more predefined conditions. In this manner, nodes 121-125 may be selectively configured to include communication session logic, such as one or more communication session control components (not illustrated) and/or one or more communication session processing triggers (e.g., ringback trigger 119), for processing (e.g., establishing, routing, etc.) communication sessions and, when necessary, temporarily suspending the processing of a communication session in order for a particular node to determine if a customized ringback (e.g., customized ringback 101) is required, to retrieve customized ringbacks from ringback repositories 127 and/or 129 when required, and to transfer customized ringbacks to calling parties at originating devices when appropriate. For descriptive purposes, the various ringback triggers of system 100 will be referred to individually and collectively as ringback trigger 119.

In particular implementations, ringback trigger 119 is configured as a "trigger" that invokes the custom ringback service of system 100 based on the reception of a connection signal from a calling party at an originating device to establish a communication session with a called party at a receiving device. For example, ringback trigger 119 may be encountered by the reception of specific digit string signals, such as a string of digits corresponding to an address (e.g., telephone number, MAC address, IP address, etc.) of a calling and/or called party. Additionally or alternatively, ringback trigger 119 may invoke the custom ringback service of system 100 based on one or more predefined conditions provided by a subscriber. These predefined conditions may include criteria, such as time of day, day of week, day of year, and/or any other suitable scheduling datum, as well as include other policy based factors, such as a directory address (e.g., telephone number, machine identification number, etc.) of a calling and/or called party, available features of an originating device of a calling party (e.g., audio interface, visual display, vibratory mechanism, etc.), mere preferences of the calling or called party, and the like. As such, it is contemplated that subscribers of the custom ringback service of system 100 may be the calling and/or the called party. It is also envisioned that ringback trigger 119 may be established having various granularities. That is, ringback trigger 119 may have applicability ranging from specific communication session instances (e.g., particularly individualized to calling parties based on the aforementioned predefined conditions) to general communication session instances (e.g., generally applicable to calling parties).

Accordingly, nodes 121-125 can be configured to serve as communication session and/or ringback transmission controllers. That is, nodes 121-125 can be configured to establish and route communication sessions between calling parties at originating devices (e.g., mobile voice station 105) and called parties at receiving devices (e.g., voice station 103), as well as transport customized ringbacks (e.g., customized ringback 101) to calling parties at originating devices during the "connection stage" of those communication sessions based on one or more ringback triggers 119. Further, nodes 121-125 may be configured to translate standardized communication session commands into specific communication session processing commands based on information stored to a user profile. User profile information may be included as part of ringback trigger 119, may be utilized to generate ringback trigger 119, or may be queried for from user profiles repository 131. It is contemplated, however, that the functioning of nodes 121-125 may be combined into a single intelligent network platform or distributed into alternative pluralities of intelligence platforms. For example, nodes 121-125 may be combined into a single CO servicing communication devices 103-107. Additionally or alternatively, nodes 121-125 may be distributed as one or more EOs, wherein communication session processing commands may be acquired from a centralized and/or distributed communication session controller(s). Further, nodes 121-125 can be configured, based on communication session processing commands, to request and command ringback repositories 127 and/or 129 to transmit customized ringbacks to originating devices during the "connection stages" of various communication sessions. It is noted that the functions of nodes 121-125 may be assumed or distributed to ringback platform 117, as well as vice versa. The generation, establishment, and operation of ringback triggers are described in more detail according to FIGS. 2, 4, and 6.

System 100 also includes ringback content repositories 127 and/or 129, as well as user profiles repository 131. Ringback content repositories 127 and/or 129 may include actual customized ringback content, such as any media or multimedia-type content, e.g., any aural (e.g., music, sound, utterance, etc.), visual (e.g., image, text, video, etc.), and/or vibratory (e.g., pulse pattern, etc.) indicia. While it is contemplated that ringback content particularly includes content recorded from, or otherwise supplied by, subscribers, embodiments of system 100 are not so limited. For instance, repositories 127 and 129 may include links or indicators, e.g., URIs, for acquiring the actual content corresponding to a customized ringback from other repositories or storage locations. In other instances, ringback content stored in ringback repositories may include ringback content provided by third-party suppliers or a service provider. These additional forms of ringback content may be modified by subscribers and/or made to append to the ringback content provided by subscribers.

User profiles repository 131 may include information corresponding to subscribers, such as: subscription information (account numbers, usernames, passwords, security questions, monikers, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies (e.g., predefined conditions for triggering the custom ringback services of system 100), associated users/devices, etc., as well as any other suitable information.

Accordingly, it is contemplated that the physical implementations of repositories 127-131 may take many forms, including, for example, portions of existing repositories of a service provider, new repositories of a service provider, third-party repositories, and/or shared-repositories. As such, repositories 127-131 can be configured to communicate over system 100 through any suitable messaging protocol, such as LDAP, XML, open database connectivity (ODBC), structured query language (SQL), and/or the like, as well as combinations thereof. In those instances when repositories 127-131 are provided in distributed fashions, information and content available at repositories 127-131 may be located utilizing various querying mechanisms, such as electronic number matching (ENUM), distributed universal number discovery (DUNDi), uniform resource identifiers (URI), and the like.

While system 100 is illustrated in FIG. 1, the components are exemplary in nature, and indeed, additional or alternative components and/or implementations may be utilized.

Figure 3:
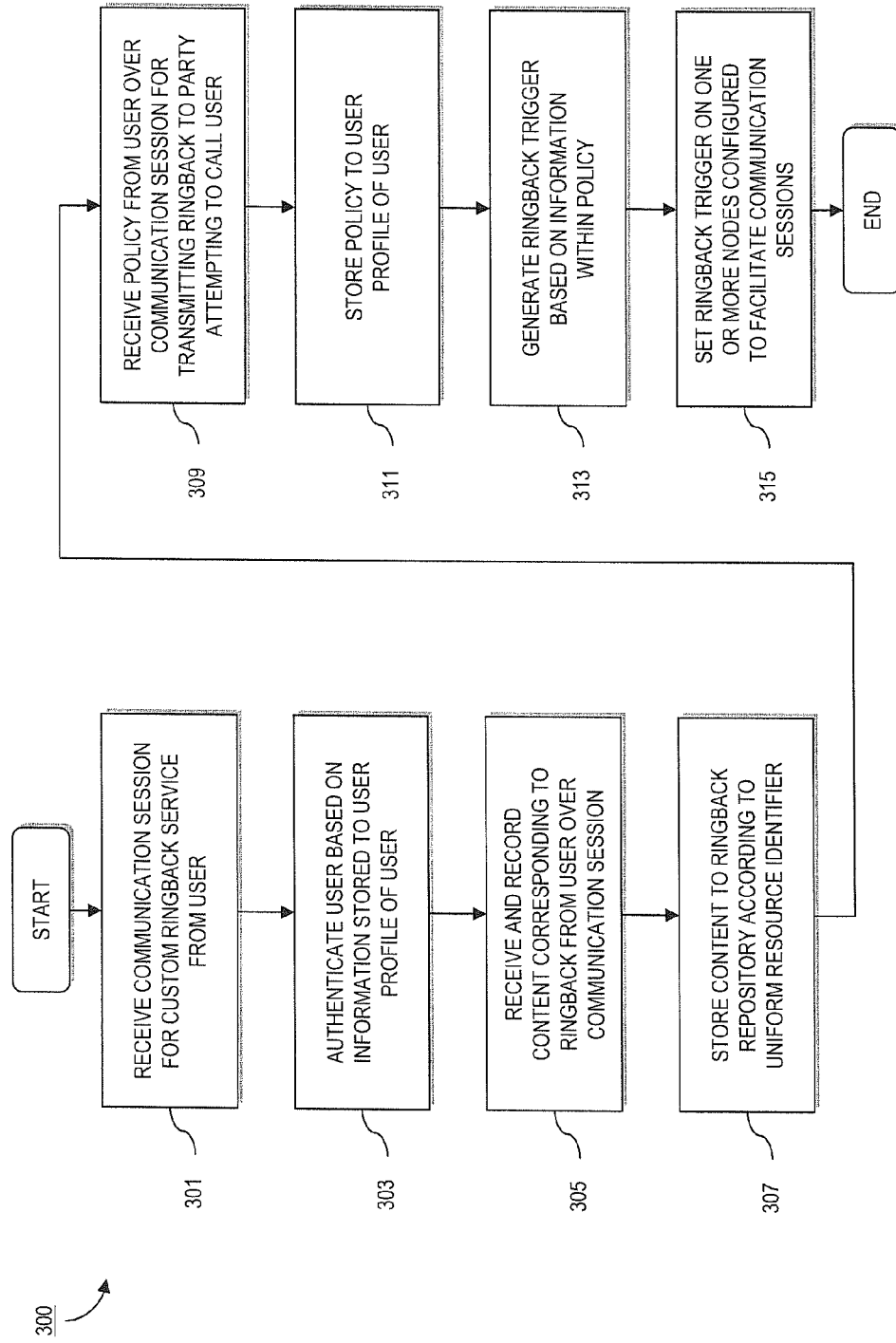
FIG. 3 is a flowchart of a process for acquiring, from a subscriber, content corresponding to a customized ringback, according to an exemplary embodiment.

FIG. 3 is a flowchart of a process for acquiring, from a subscriber, content corresponding to a customized ringback, according to an exemplary embodiment. For illustrative purposes, process 300 is described with reference to the components of system 100. It is noted that the steps of process 300 may not be all inclusive, may include other steps not shown, and may be performed in any suitable order.

In step 301, ringback platform 200 receives a communication session for the customizable ringback service from a user. That is, a user at a voice-enabled device (e.g., voice station 103) can establish a communication session with IVR module 205 of ringback platform 200 by placing a call to a destination address, e.g., a toll-free phone number, of ringback platform 200 via, for example, telephony network 109. According to other embodiments, users may access ringback platform via messaging interface module 207 by sending SMS and/or MMS messages to the destination address of ringback platform 200. In still further embodiments, ringback platform is made available to subscribers via online interface module 209. Namely, the custom ringback services of ringback platform 200 may be virtualized as one or more windows of a conventional browser application.

Once connected, the user may be greeted with a "WELCOME" message, as well as a menu of options for accessing the custom ringback services of ringback platform 200. If the user is a new user, the user may select an option, e.g., "REGISTRATION" option, for subscribing to the custom ringback service. During registration, IVR module 205 may acquire information from the user, e.g., some or all of the user profile information previously delineated, as well as provide the user with sufficient authentication information for establishing future sessions with ringback platform 200.

After successful registration, the user (now subscriber) may return to the menu of options to create and/or manage one or more customized ringbacks. That is, subscribers can select from a "CREATE CUSTOMIZED RINGBACK" option or a "MANAGE CUSTOMIZED RINGBACK" option for creating and/or managing one or more customized ringbacks. Per step 303, IVR module 205, messaging interface module 207, and/or online interface module 209 may authenticate the user before enabling the user to create and/or manage one or more customized ringbacks. According to certain embodiments, authentication (or authorization) is performed by authentication module 201 via modules 205-209. Nevertheless, modules 205-209 may request a PIN, or other credential information, such as a voice print, username, password, coded key, etc., from subscribers, which can be compared against information stored to a profile of the subscriber for permitting or denying access to the custom ringback services provided by ringback platform 200. Once authenticated, the user will be permitted to create and/or manage one or more customized ringbacks, such as customized ringback 101, via suitable interaction with one or more of modules 205-209.

Assuming the user selects the "CREATE CUSTOMIZED RINGBACK" option, modules 205-209 and/or recording module 213 may receive and record content corresponding to a customized ringback transmitted to ringback platform 200 by the subscriber over the communication session via the voice-enabled device. That is, modules 205-209 may prompt the user to record a customized ringback, wherein the user will be permitted to create a customized ringback by speaking or providing content to be used as the customized ringback. According to various embodiments, content may be provided as one or more MMS messages or as one or more electronic files "uploaded" to ringback platform 200 via, for example, messaging interface module 207 and online interface module 209, respectively. In any case, however, modules 205-209 and/or recording module 213 may receive and record content corresponding to a customized ringback from the subscriber over the communication session, per step 305. At step 307, one or more of modules 205-209 and/or recording module 213 store the recorded and/or provided content to a suitable location, such as ringback content repositories 127 and/or 129. According to one embodiment, customized ringbacks are stored to ringback content repositories 127 and/or 129 according to a URI, or any other suitable locator and/or name.

Assuming the subscriber successfully created at least one customized ringback or assuming the user selects the "MANAGE CUSTOMIZED RINGBACK" option, subscribers may be permitted to convey policy information for transmitting the customized ringback(s) to one or more parties attempting to establish a communication session with the subscriber, as per step 309. That is, one or more of modules 205-209 may prompt the user for one or more of the described predefined conditions for making customized ringback(s) available to calling parties. In step 311, one or more of modules 205-209 store this policy information to a user profile of the subscriber residing on, for example, user profiles repository 131, and/or any other suitable location, such as ringback content repositories 127 and/or 129. Accordingly, this policy information may be used to selectively provide customized ringbacks to select individuals or groups of individuals. For example, customized ringbacks may be created and provided to select friends, family, co-workers, telemarketers, etc. Furthermore, the customized ringbacks may be created and provided for particular events or occasions, such as birthdays, holidays, farewells, parties, weddings, invitations, etc. Still further, customized ringbacks may be created and managed for providing information (e.g., advertisements, news, horoscopes, sports scores, etc.) or warding off certain classes of callers (e.g., SPAM callers, telemarketers, etc.).

After successfully facilitating the creation and/or management of one or more customized ringbacks, one or more of modules 205-209 may port the policy information, as well as the URI of the customized ringback, to provisioning module 211 so that provisioning module 211 may generate a ringback trigger, e.g., ringback trigger 119, for detecting one or more of the predefined conditions and for deploying the customized ringback to calling parties upon the occurrence of one or more of the predefined conditions. Additionally or alternatively, modules 205-209 may request ringback content repositories 127-129 and/or user profiles repository 131 to relay this information to provision module 211. Nevertheless, provisioning module 211 may generate a ringback trigger, such as ringback trigger 119, based on this information, during step 313. As such, provisioning module 211 may then set the generated ringback trigger on one or more nodes, e.g., nodes 121-125, configured to establish communication sessions between calling and called parties, at step 315.

Figure 4A:
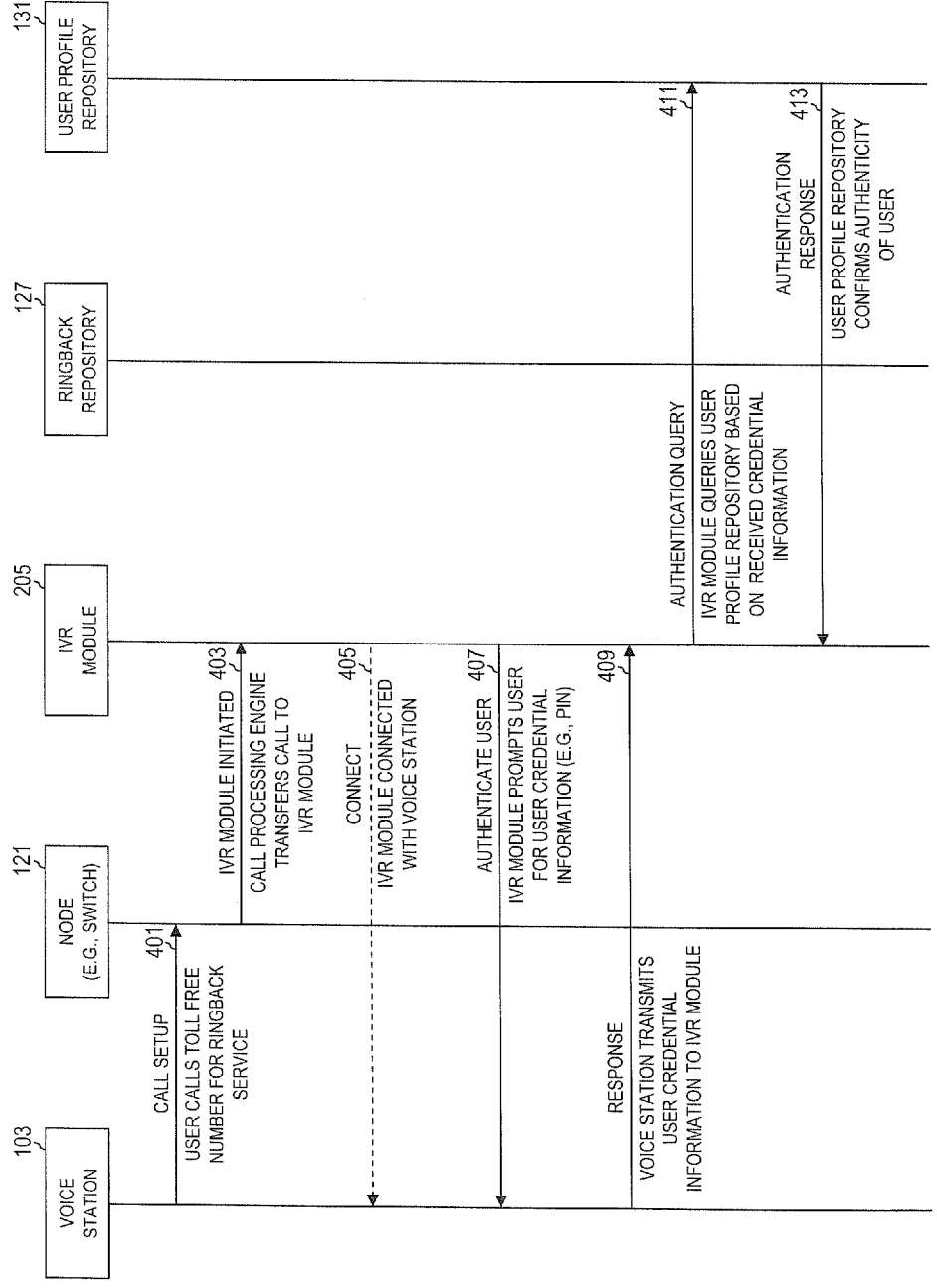
FIGS. 4A-4C are sequence diagrams of a communication session initiated by a subscriber at a voice-enabled device for communicating content corresponding to a customized ringback to the ringback platform of FIG. 2, according to an exemplary embodiment.
Figure 4B:
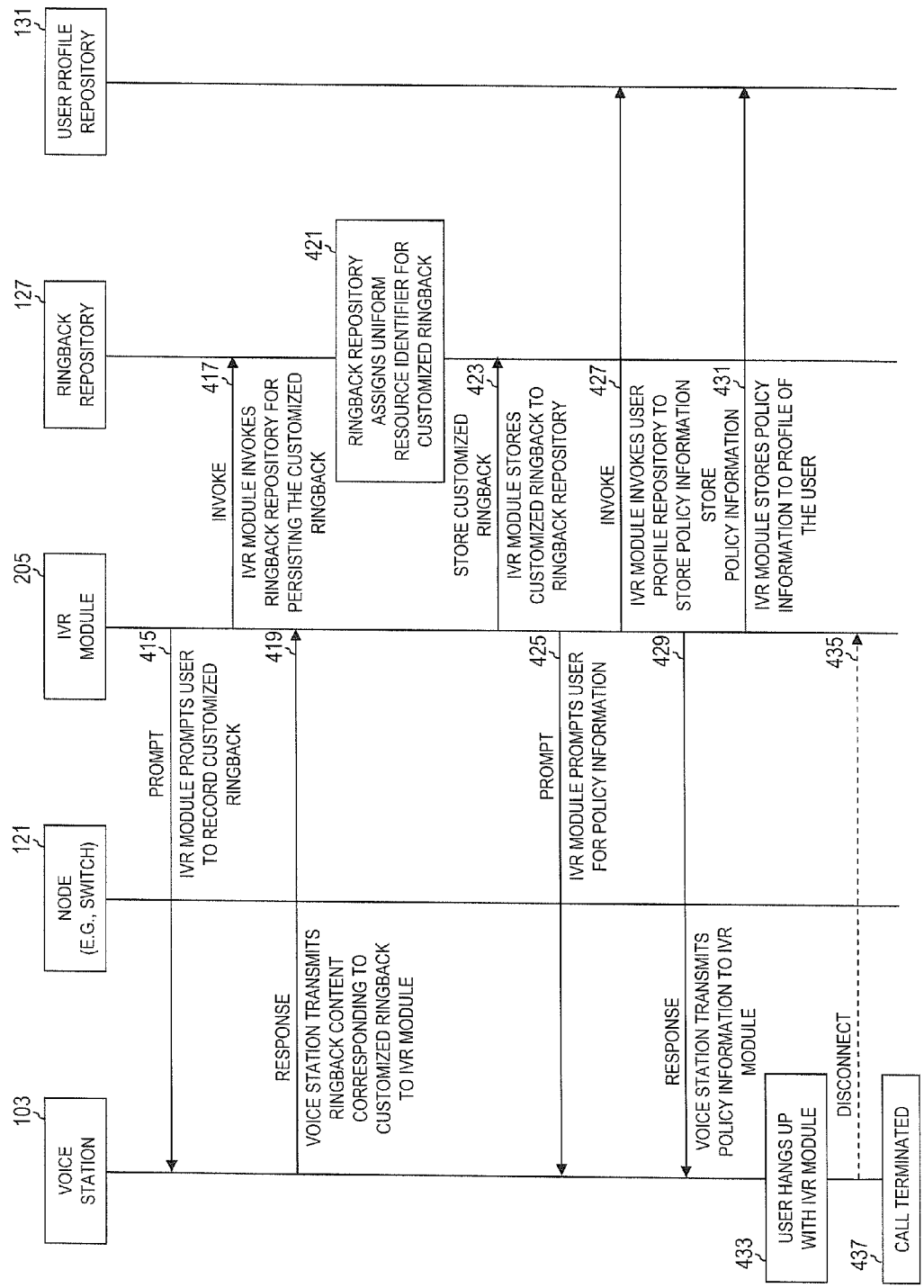
Figure 4C:
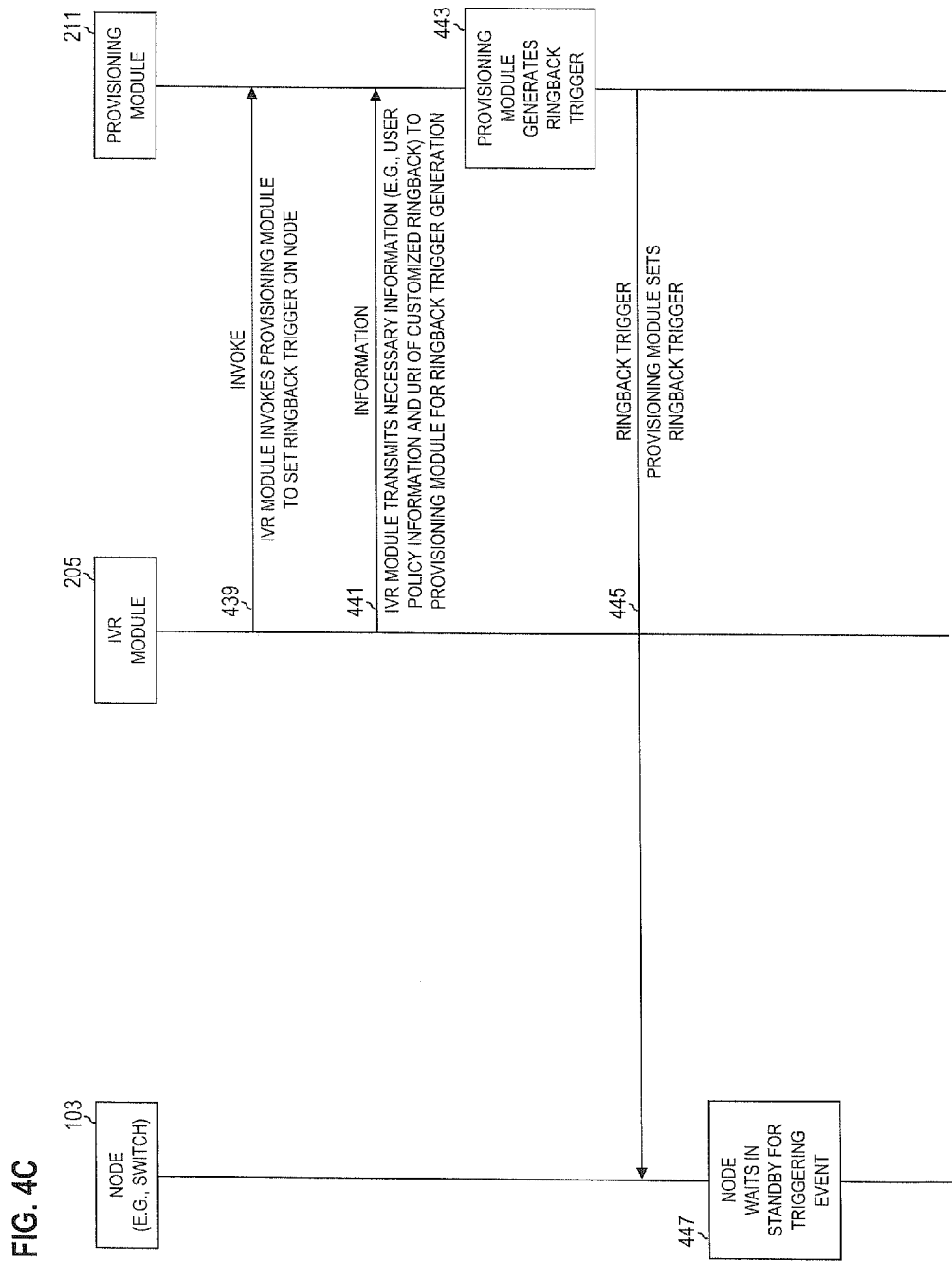

FIGS. 4A-4C are sequence diagrams of a communication session initiated by a subscriber at a voice-enabled device for communicating content corresponding to a customized ringback to the ringback platform of FIG. 2, according to an exemplary embodiment. For the purposes of illustration, the communication session is assumed to be a telephony call placed via voice station 103 to ringback platform 200 via node 121 of telephony network 109. As such, a subscriber initiates the call to ringback platform 200 by dialing a designated telephony address, such as a toll-free access number (e.g., 1-800, 1-888, etc.), of ringback platform 200 via voice station 103, per step 401. Dialing the address causes voice station 103 to initiate call setup signaling and/or messaging with node 121, e.g., a call processing switch of telephony network 109, which is configured to route such calls to IVR module 205. Accordingly, node 121 initiates IVR module 205 by transferring the call to IVR module 205, at step 403.

Per step 405, IVR module 205 accepts the call and is connected with voice station 103. Once connected, IVR module 205 attempts to authenticate the subscriber by prompting the subscriber for credential information, such as a PIN, at step 407. When the subscriber replies, such as by spoken utterance(s) or DTMF signal(s), voice station 103 transmits the reply, i.e., user credential information, to IVR module 205, per step 409. In step 411, IVR module 205 attempts to validate the subscriber by querying user profile repository 131 based on the received credential information. User profile repository 131 responds, at step 413, either confirming or rejecting the authenticity of the subscriber. If user profile repository 131 confirms the authenticity of the subscriber, then IVR module 205 grants the subscriber access to the custom ringback services of ringback platform 200. If the user profile repository rejects the authenticity of the subscriber, IVR module 205 either re-prompts the subscriber to input valid credential information and/or terminates the call.

Assuming the subscriber is successfully authenticated, IVR module 205 prompts the subscriber to record a customized ringback, at step 415. In a parallel or sequential manner, IVR module 205 invokes ringback repository 127 for persisting a customized ringback recorded, or to be recorded, by IVR module 205, per step 417. Per step 419, ringback repository 127 assigns a storage location and address, e.g., URI, for the recording or potential recording. Still in a parallel or sequential manner, the subscriber responds to the recording prompt of IVR module 205, such as by dictating a message intended to be used as a customized ringback to IVR module 205. At step 421, voice station 103 transmits the dictation to IVR module 205 for recording; however, it is to be appreciated that IVR module 205 may port the dictation to recording module 213 for recording purposes. Once recorded, IVR module 205 stores, as in step 423, the customized ringback to ringback repository 127 at the established location, using the established URI.

Assuming successful customized ringback recordation, IVR module 205 prompts the subscriber for policy information for deploying the customized ringback in according with the desires of the subscriber, per step 425. In a parallel or sequential manner, IVR module 205 invokes user profiles repository 131 for persisting the policy information supplied to, or to be supplied to, IVR module 205, at step 427. The subscriber responds to the prompts of IVR module 205, such as by dictating an originating device address, receiving device address, scheduling data, and/or any other suitable predefined condition to IVR module 205, such as those predefined conditions previously delineated. During step 429, voice station 103 transmits the dictation to IVR module 205. In step 431, IVR module 205 stores the policy information to a user profile of the subscriber. When finished, the subscriber may hang up with IVR module 205, per step 433. In step 435, voice station 103 and IVR module 205 are disconnected. Per step 437, the call is terminated.

Assuming successful customized ringback creation and/or policy information acquisitioning, IVR module 205 can invoke provisioning module 211 to set a ringback trigger on one or more nodes of system 100, such as node 121, per step 439. In step 441, IVR module 205 transmits any necessary information to provisioning module 211 for ringback trigger generation. This information may include the policy information of the user, as well as the address of the customized ringback created by the subscriber and, subsequently, stored to ringback repository 127. It is contemplated, however, that IVR module 205 may request ringback repository 127 and/or user profiles repository 131 to supply provisioning module 211 with the necessary information. Accordingly, provisioning module 211 generates a ringback trigger based on the supplied information, per step 443. At step 445, provisioning module 211 sets the ringback trigger on one or more nodes of system 100, such as node 121. During step 447, nodes set with the ringback trigger, such as node 121, wait in standby for a triggering event(s) that causes the customized ringback to be provisioned according to the desires of the subscriber.

Figure 5:
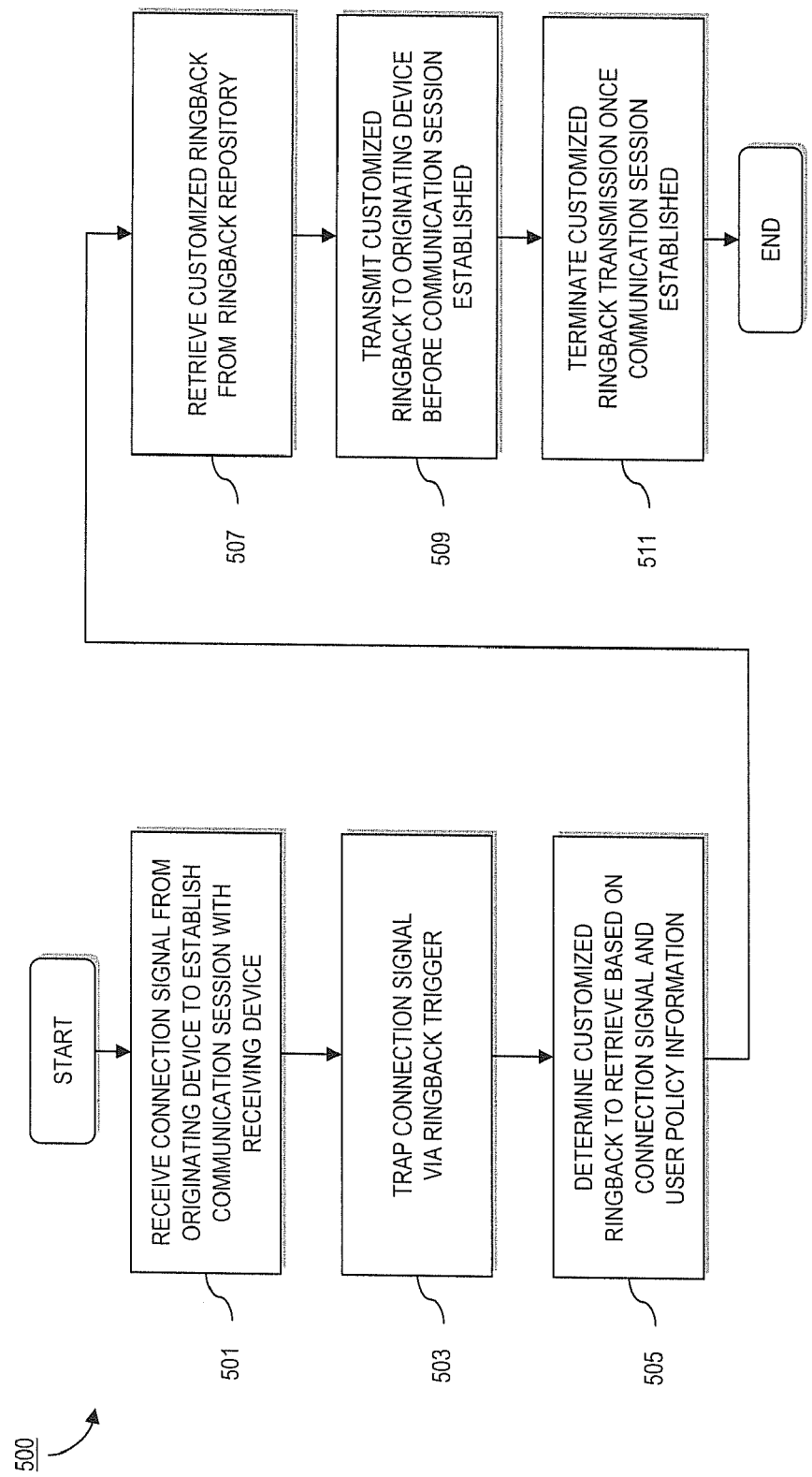
FIG. 5 is a flowchart of a process for provisioning customized ringbacks, according to an exemplary embodiment.

FIG. 5 is a flowchart of a process for provisioning customized ringbacks, according to an exemplary embodiment. For illustrative purposes, process 500 is described with reference to the components of system 100. It is noted that the steps of process 500 may not be all inclusive, may include other steps not shown, and may be performed in any suitable order.

In step 501, a network node, e.g., node 123, receives a connection signal from a calling party through a voice-enabled device (e.g., mobile voice station 105) to establish a communication session with a called party, e.g., the subscriber of the custom ringback services of system 100, through a receiving device (e.g., computing device 107). Per step 503, the network node traps (or otherwise processes) the connection signal via, for example, ringback trigger 119. That is, the network node may determine, via ringback trigger 119, if a customized ringback (e.g., customized ringback 101) is to be relayed to the calling party, as well as which customized ringback is to be retrieved from one or more ringback content repositories (e.g., ringback repositories 127 and/or 129), during step 505. Namely, ringback trigger 119 may utilize one or more application specific processes for detecting one or more predefined conditions for deploying a customized ringback according to the desires of the called party, and based on the connection signal and/or information stored to a profile of the subscriber, determine which customized ringback is to be retrieved.

If a customized ringback is to be transmitted to the calling party, ringback trigger 119 retrieves the appropriate customized ringback from one or more of ringback content repositories 127 and/or 129, as in step 507. According to one embodiment, ringback trigger 119 retrieves the appropriate customized ringback via a URI, or other suitable locator and/or name, of the customized ringback. During this period, the network node or another network node (e.g., node 125) can attempt to setup the communication session with the subscriber through the receiving device, e.g., computing device 107, of the subscriber. In this manner, the communication session may be routed to any suitable network node that serves the receiving device of the subscriber. As such, the suitable network node can be configured to alert the receiving device of the incoming communication session. Before the communication session is established, i.e., accepted by the subscriber, the network node is configured to transmit the customized ringback to the calling party through the originating device of the calling party. In particular embodiments, the customized ringback may be transmitted to the calling party as an analog voice signal or as one or more session initiation protocol real-time transfer protocol packets, as well as any other suitable transmission, or combinations thereof. Accordingly, once the called party, i.e., the subscriber, accepts the communication session, the customized ringback transmission is terminated by the network node, per step 511.

Figure 6B:
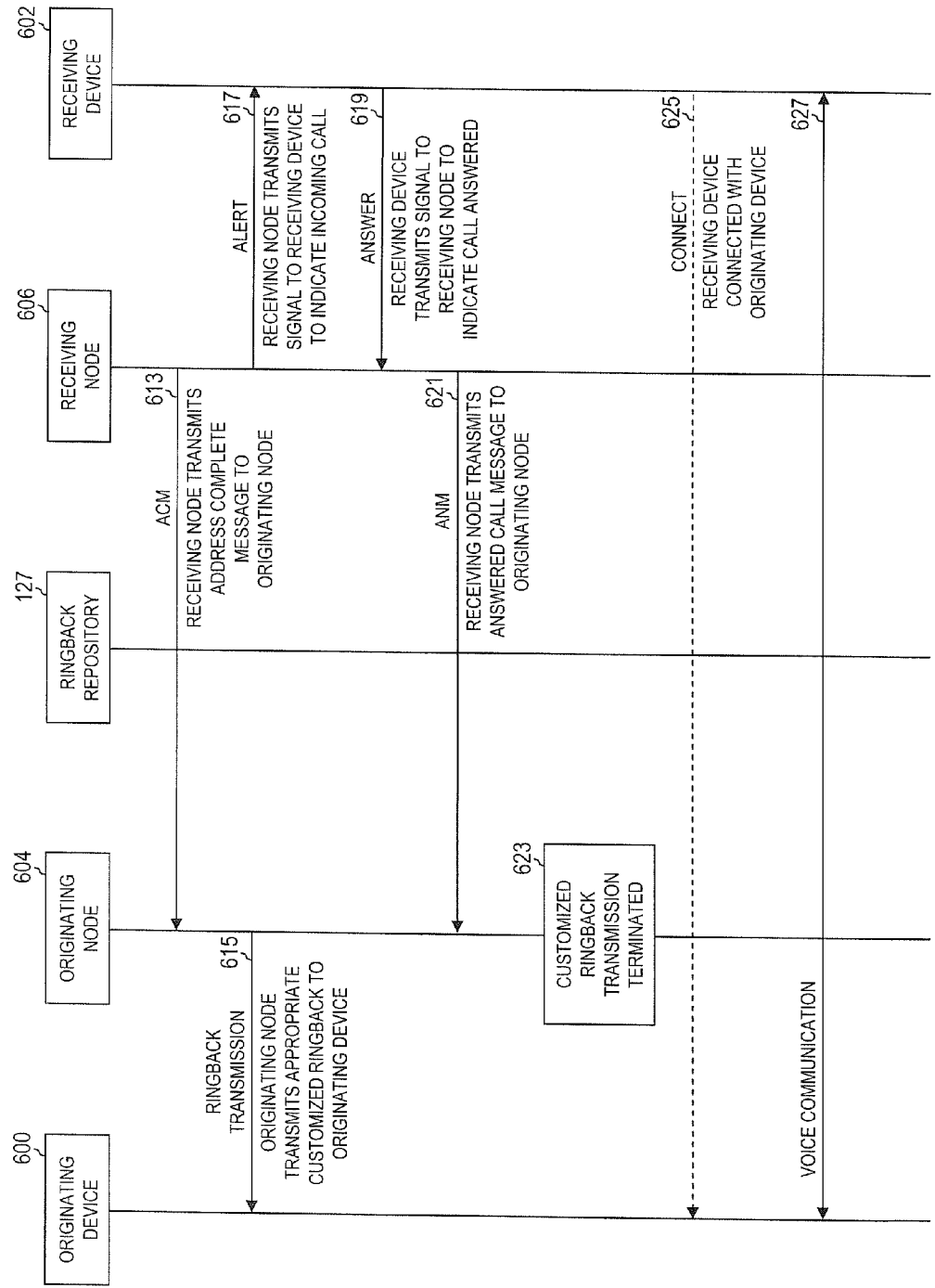

FIGS. 6A and 6B are sequence diagrams of a communication session utilizing a customized ringback in lieu of a standard ringback tone, according to an exemplary embodiment. For the purposes of illustration, the communication session is described as a telephony call placed via an originating device 600, such as mobile voice station 105, to a receiving device 602, such as voice station 103, via an originating node 604, e.g., node 123, and receiving node 606, e.g., node 121, of wireless network 111 and telephony network 109, respectively.

At step 601, a calling party initiates the call to a called party, i.e., a subscriber of the custom ringback service, by dialing a designated telephony address, e.g., telephony number, of the called party via originating device 600. Dialing the address causes originating device 600 to initiate call setup signaling and/or messaging with originating node 604 that includes ringback trigger 119 set thereon. This call setup signaling and/or messaging embodies a connection signal including, for example, an originating address of originating device 600 and/or a receiving address of receiving device 602. In particular embodiments, the connection signal may also include date and/or time information corresponding to the date and/or time when the attempted communication session was initiated.

At step 603, originating node 604 detects a triggering event based on the connection signal, at step 603. In this manner, the appearance of the call for the subscriber at originating node 604 causes ringback trigger 119 to be encountered, and a corresponding query or other like message to be transmitted to ringback repository 127, per step 605. That is, ringback trigger 119 requests an appropriate customized ringback from ringback repository 127 based on information corresponding to the originating address of the originating device 600, the receiving address of the receiving party 602, and/or one or more predefined conditions of a policy of the subscriber, such as particular date and time criteria. According to one embodiment, the request simply provides an address, e.g., a URI, of the appropriate customized ringback. In other embodiments, ringback trigger 119 requests ringback repository to return the appropriate customized ringback based on the information corresponding to the originating address of the originating device 600, the receiving address of the receiving party 602, and/or one or more predefined conditions of a policy of the subscriber. As such, ringback repository 127 can determine the appropriate customized ringback to transmit to originating node 602 based on the query, step 607. Thus, ringback repository transmits the appropriate customized ringback to originating node 604, per step 609.

In a parallel or sequential fashion, originating node 604 transmits, per step 611, an initial address message (IAM), or other like message, to receiving node 606 for routing purposes, i.e., for establishing the communication session between originating device 600 and receiving device 602. That is, the IAM initiates seizure of receiving node 606 and transmits, for example, the telephony address of receiving device 602 to receiving node 606 so that receiving node 606 can properly handle the call and route the call to receiving device 602. In response, receiving node 606 transmits an address complete message (ACM) to originating node 604, per step 613, to indicate that the IAM and, subsequently, sufficient addressing information for routing the call to receiving device 602 was received.

At this point, originating node 604 may transmit the appropriate customized ringback to originating device 600, per step 615. Further, receiving node 606 may transmit an alert to receiving device 602 to indicate the existence of an incoming call, per step 617. Once, however, the subscriber, i.e., the called party, answers the incoming call, i.e., at step 619, receiving device 602 transmits an alert to receiving node 606 to indicate that the call was answered. In response, receiving node 606 transmits an answered call message (ANM) to originating node 604, to indicate to originating node 604 that the call was answered. Thus, in step 625, originating node 604 terminates the transmission of the customized ringback to originating device 600. As such, receiving device 602 is connected to originating device 600, at step 627. Per step 629, a voice communication session ensues between the calling party and the subscriber, i.e., the called party.

The processes described herein for providing custom ringback services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
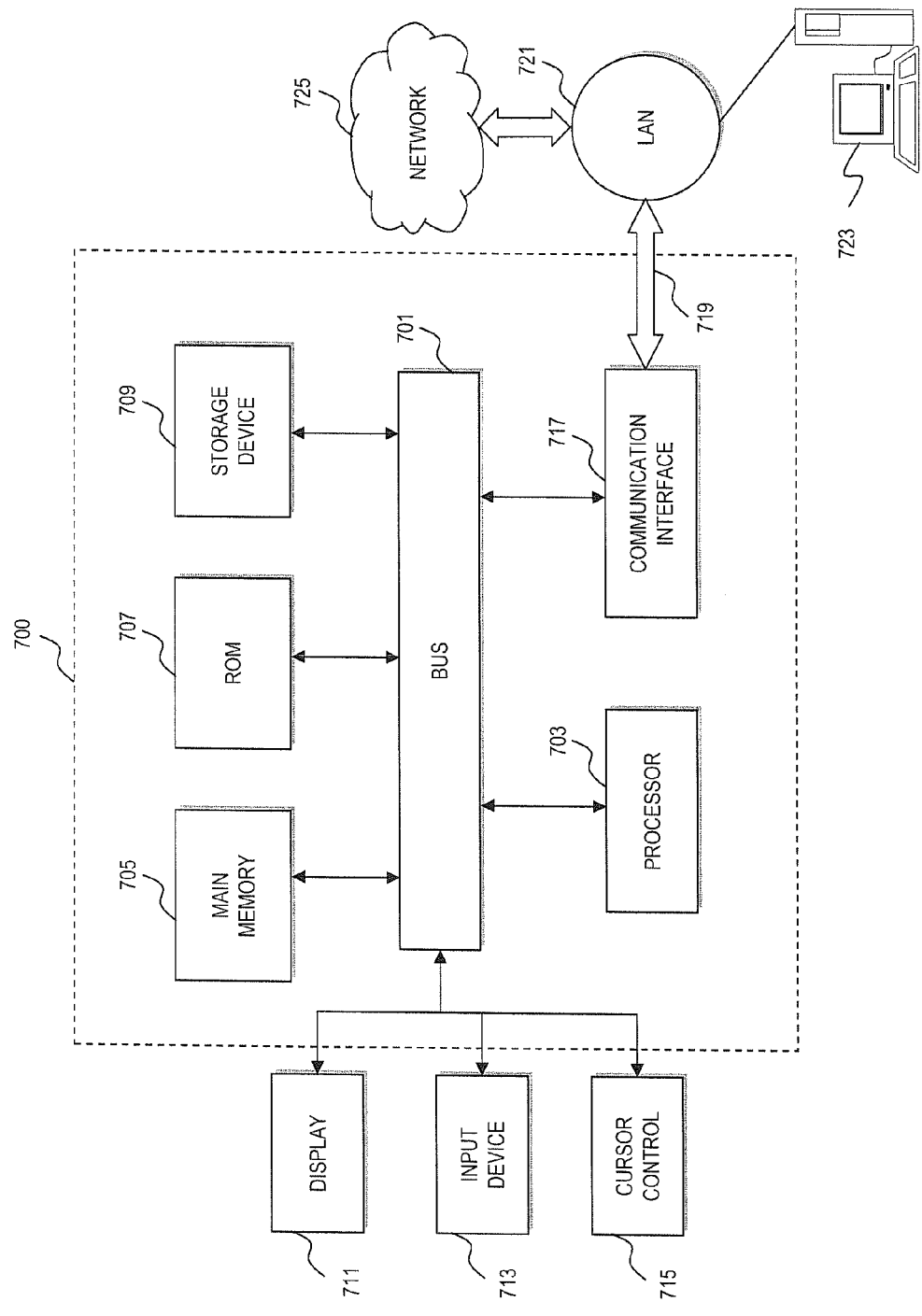
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    prompting a user for content as part of a managed ringback service;
    receiving the content from the user, wherein the content is set as a ringback; and
    receiving policy information from the user, wherein the policy information defines criteria for transmitting the ringback to a caller in response to the caller initiating a communication session with the user.

2. A method according to claim 1, further comprising:
    transmitting the content to a media module configured to generate an audio file.

3. A method according to claim 2, wherein a web module is configured to assign a uniform resource identifier to the audio file.

4. A method according to claim 1, wherein a profile is created for the user, the profile including information specifying an address of an originating device and scheduling information for providing the ringback to the originating device.

5. A method according to claim 1, wherein a provisioning module is configured to generate a ringback trigger corresponding to an address of a destination device for use on a switch that is configured to establish communication between an originating device of the caller and the destination device.

6. A method according to claim 1, wherein the step of prompting is executed in response to the user calling a toll-free number.

7. A method according to claim 1, wherein the ringback is transmitted to an originating device as an analog voice signal or as one or more session initiation protocol real-time transfer protocol packets.

8. A method according to claim 1, wherein the ringback is stored to a repository as a companding algorithm waveform audio compilation.

9. A method according to claim 1, wherein the ringback includes either a greeting message, a song, an invitation message, or a message responding to an unwanted communication session.

10. An apparatus comprising:
    an interactive voice response module configured to prompt a user for content as part of a managed ringback service, and to receive the content from the user, wherein the content is set as a ringback,
    wherein the interactive voice response module is further configured to receive policy information from the user, the policy information defining criteria for transmitting the ringback to a caller in response to the caller initiating a communication session with the user.

11. An apparatus according to claim 10, further comprising:
    a media module configured to generate an audio file based on the content.

12. An apparatus according to claim 11, further comprising:
    a web module configured to assign a uniform resource identifier to the audio file.

13. An apparatus according to claim 10, wherein a profile is created for the user, the profile including information specifying an address of an originating device and scheduling information for providing the ringback to the originating device.

14. An apparatus according to claim 10, further comprising:
a provisioning module configured to generate a ringback trigger corresponding to an address of a destination device for use on a switch that is configured to establish communication between an originating device of the caller and the destination device.

15. An apparatus according to claim 10, wherein the user calls a toll-free number to be directed to the interactive voice response module.

16. An apparatus according to claim 10, wherein the ringback is transmitted to an originating device as an analog voice signal or as one or more session initiation protocol real-time transfer protocol packets.

17. An apparatus according to claim 10, further comprising:
a repository configured to store the ringback as a companding algorithm waveform audio compilation.

18. An apparatus according to claim 10, wherein the ringback includes either a greeting message, a song, an invitation message, or a message responding to an unwanted communication session.

19. A system comprising:
a ringback platform configured to prompt a user for content through a menu of options as part of a managed ringback service, and to receive the content from the user, wherein the content is set as a ringback, the ringback platform being further configured to receive an identifier corresponding to the ringback from the user, the identifier being associated with a caller;
a repository configured to store the ringback among a plurality of ringbacks corresponding to other users; and
a node configured to detect initiation of a communication session by the caller, and to retrieve the ringback in response to detection, wherein the ringback is provided to the caller during establishment of the communication session;
wherein the ringback platform includes,
a media module configured to generate an audio file based on the content,
a web module configured to assign a uniform resource identifier to the audio file, and
a provisioning module configured to generate a ringback trigger corresponding to the identifier, the identifier corresponding to a destination device of the user configured to terminate the communication session,
wherein the ringback trigger causes the node to retrieve the ringback from the repository based on the uniform resource identifier of the ringback.

* * * * *